No. 766,951. Patented August 9, 1904.

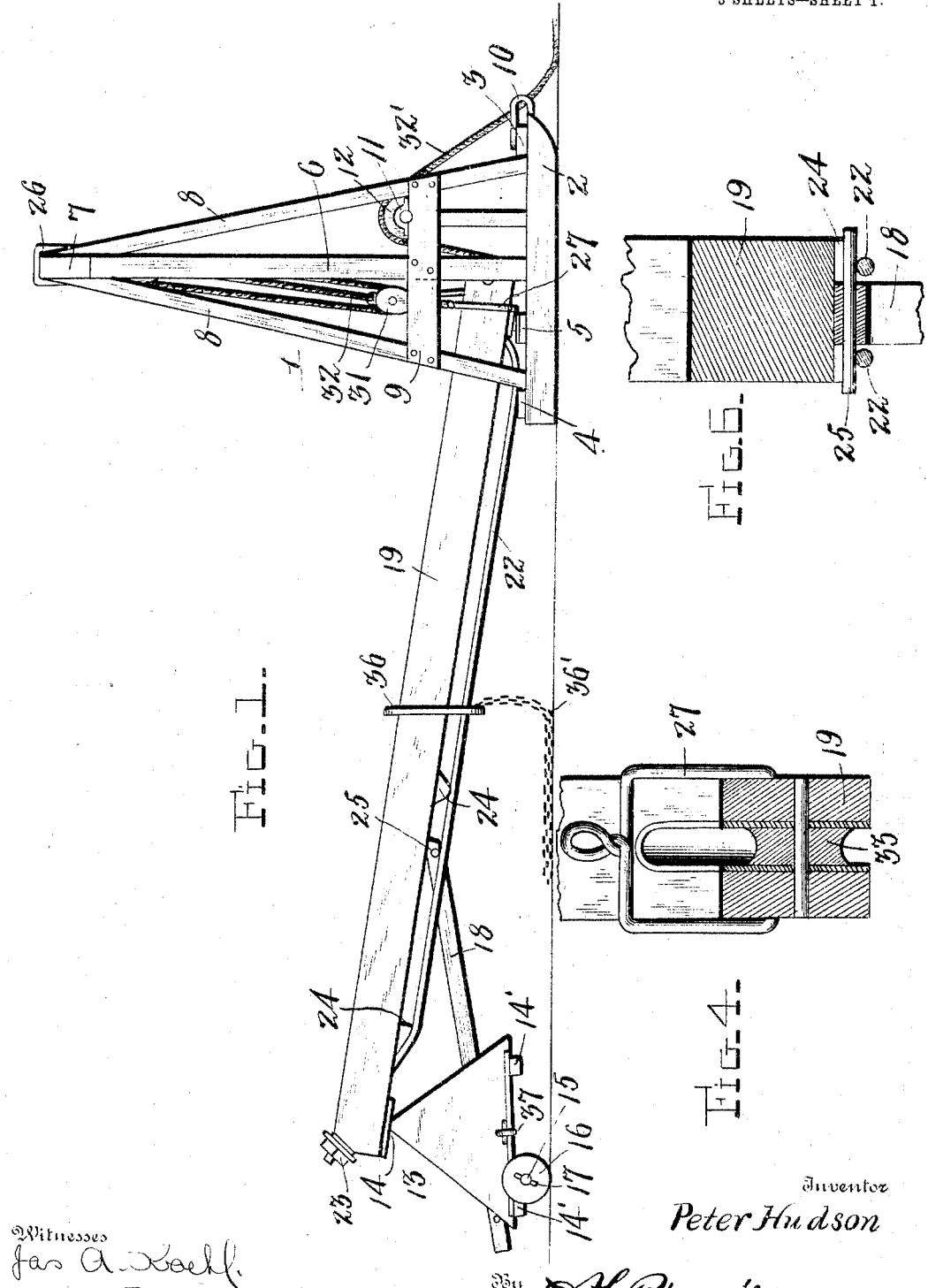

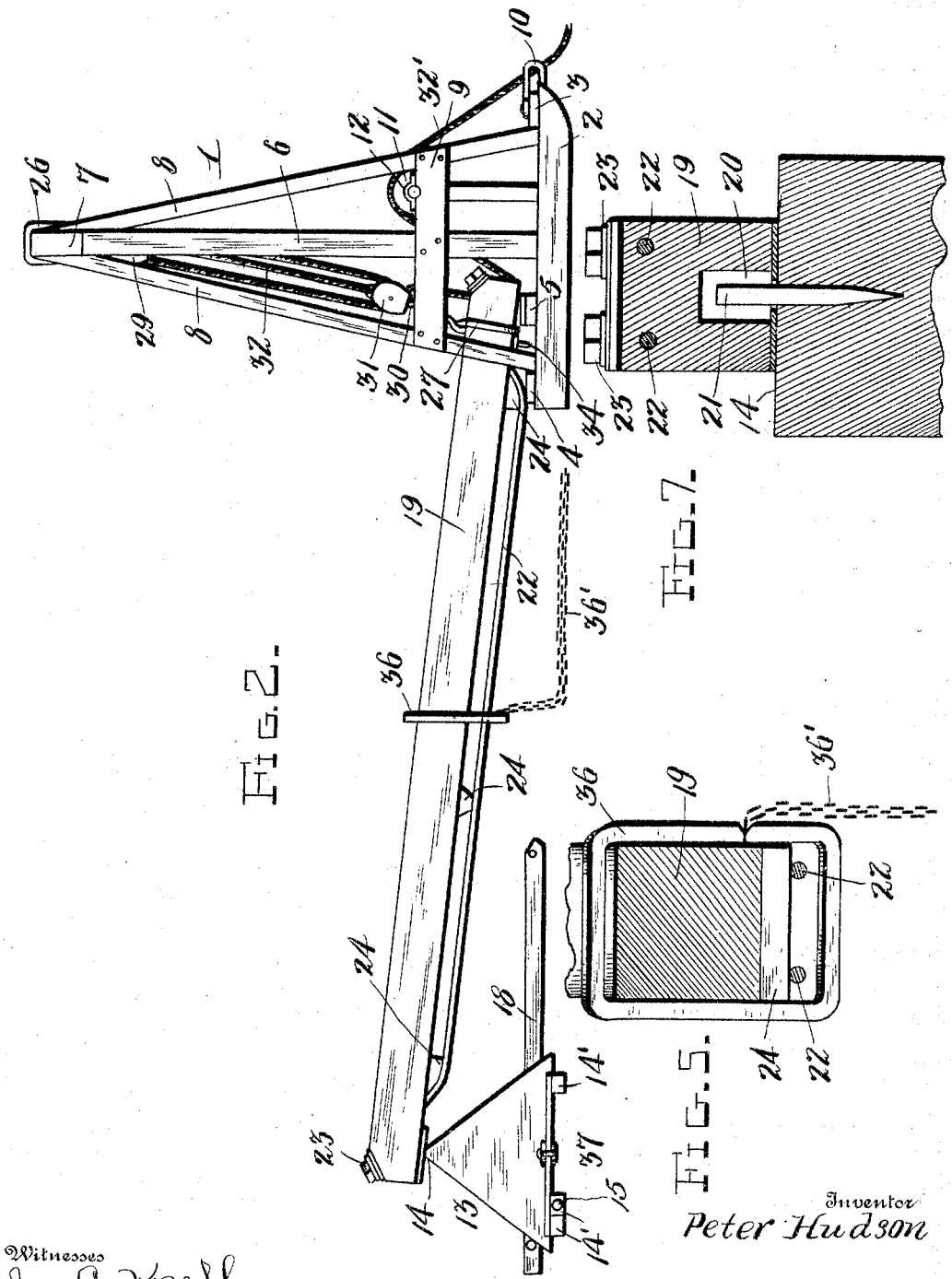

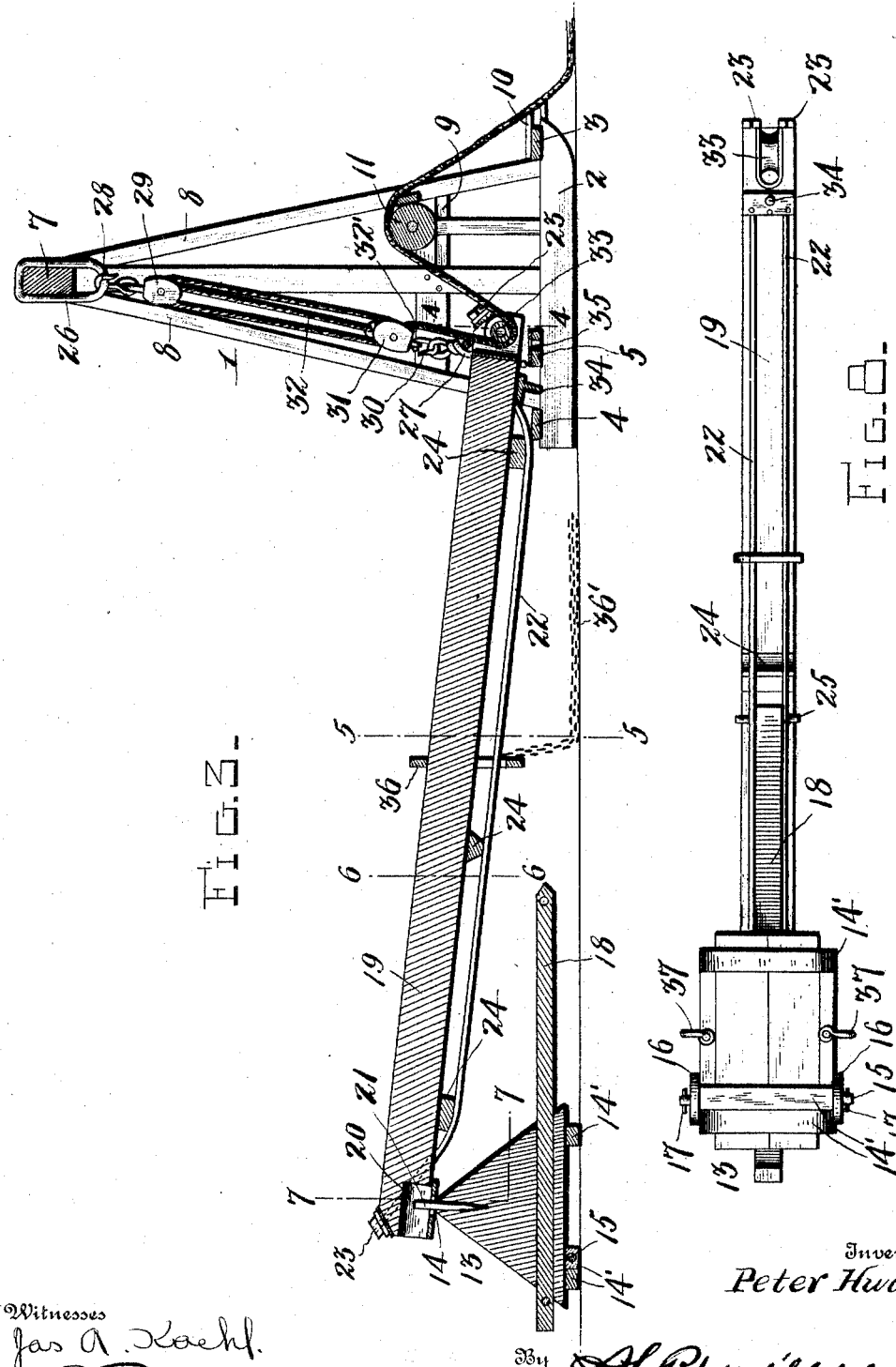

UNITED STATES PATENT OFFICE.

PETER HUDSON, OF VINCENNES, INDIANA, ASSIGNOR OF ONE-HALF TO FRANK POWERS, OF VINCENNES, INDIANA.

STUMP-PULLER.

SPECIFICATION forming part of Letters Patent No. 766,951, dated August 9, 1904.

Application filed March 10, 1904. Serial No. 197,569. (No model.)

*To all whom it may concern:*

Be it known that I, PETER HUDSON, a citizen of the United States, residing at Vincennes, in the county of Knox and State of Indiana, have invented certain new and useful Improvements in Stump-Pullers; and I do declare the following to be a full, clear, and exact description of the invention, such as will enable others skilled in the art to which it appertains to make and use the same.

This invention relates to improvements in stump-pullers, and has for its object to provide a stump-puller which is readily transportable from place to place for use and is adapted to be adjusted for use or transportation with facility.

With these and other objects in view the invention consists of certain novel features of construction, combination, and arrangement of parts, as will be hereinafter more fully described, and particularly pointed out in the appended claims.

In the accompanying drawings, Figure 1 is a side elevation of a stump-puller embodying my invention, showing the same mounted for transportation. Fig. 2 is a similar view showing the puller set for operation. Fig. 3 is a vertical longitudinal section. Figs. 4, 5, 6, and 7 are cross-sections, taken, respectively, on the lines 4 4, 5 5, 6 6, and 7 7 of Fig. 3; and Fig. 8 is a bottom plan view of the beam and rear frame.

Referring now more particularly to the drawings, the numeral 1 represents a front supporting-frame consisting of sills 2, forming runners adapted to slide along the surface of the ground, front, rear, and intermediate cross-pieces 3, 4, and 5, connecting said sills, vertical posts or standards 6, rising from the sills, and a transverse cross beam or bar 7, connecting said standards at their front ends. The standards and cross-bar form a superstructure which is braced on each side from the sills by upright inclined braces 8, and these braces and the standards are tied together by horizontal braces 9. The front cross-piece 3 carries clevises or draft connections 10, by which a draft animal or animals may be hitched to the front frame to transport the device from place to place for use. A roller 11 extends transversely at the forward end of the frame and is journaled at its ends in bearings 12 and serves to guide the hoisting-rope of the pulling-beam, as hereinafter described.

13 designates a rear supporting-frame which may be of any suitable construction to form a fulcrum-point 14 and is provided with cross-sills 14' to rest upon the surface of the ground when the device is in use and with an axle 15, arranged at the rear end thereof and carrying supporting wheels or rollers 16, detachably held upon the spindles thereof by cotter pins or keys 17. When the device is adjusted for transportation, the wheels or rollers 16 rest upon the ground, while the forward end of the frame 13 is held elevated by means of a coupling-bar 18, detachably connected at its forward end to the pulling-beam 19 in a manner hereinafter described.

The beam 19 extends longitudinally between the two frames 1 and 13 and is adapted to rock upon the fulcrum-point 14. It is provided at its rear end with a receiving-socket 20, adapted to receive a pin 21, projecting up from said fulcrum-point 14. The said pin fits loosely in the socket 20 to assist the coupling-bar 18 to hold the rear frame 13 rigidly connected to the beam when the device is in transportable condition and to allow the beam to rock upon the fulcrum-point 14 when the coupling-bar is detached and the apparatus is arranged to carry out the operation of stump-pulling. As shown, the beam is stayed and braced by longitudinal braces 22, arranged upon the under side thereof and projecting at their ends up through the beam and secured against displacement by nuts and washers 23. These braces extend in parallel relation and bear against distance-pieces 24, so that said braces are properly spaced from the beam to exert a maximum bracing action. The forward end of the coupling-bar 18 is adapted to enter between these braces and is pierced for the passage of a fastening-pin 25, which is adapted to rest upon said braces, and thus hold said bar and the front end of the rear frame 13 elevated. The beam is hung at its forward end from the frame 1 by pulleys and connections to adapt it to be adjusted to extract a stump. These comprise stirrups 26 and 27, arranged, respectively, upon the upper cross-bar 7 and the front end of the beam. Suspended from the stirrup 26 by a hook 28 is a double pulley 29, and connected to the stirrup 27 by a hook 30 is a similar double pulley 31. A hoist rope or cable 32 is connected at one end to the pulley 31 and is thence rove through the sheaves or pulleys of said double pulley, with its free end 32' extending below the lower pulley and passing under a sheave 33 on the front end of the beam, so that by a forward pull upon said free end of the rope or cable the beam may be elevated and upon the same being released the beam will descend. The free end of the rope passes over the roller 11 on the frame 1, which turns during the operation of the same to facilitate adjustment and support the rear end of the beam when the latter is raised and moved slightly forward under the pull of the rope. The beam when lowered rests at its forward end upon the cross-bar 5 of the frame 1 and is provided with a coupling-pin 34, which engages a socket 35, formed or provided upon said cross-bar. A stirrup 36 is applied to the beam and receives a chain 36', which is adapted to be passed around the stump to tie the beam thereto.

In the operation of the device the parts are normally arranged as shown in Fig. 1, in which the device is illustrated as being arranged for transportation, the front end of the beam being lowered and connected to the frame 1 and the forward end of the frame 13 being raised and coupled by the bar 18 to the beam, the rear portion of said frame 13 being supported upon the wheels or rollers 16. Upon connecting the required number of draft-animals to the draft members 10 the device may be pulled to the point where the stump is to be extracted, the front frame running on the sills or runners 2 and the rear frame on said wheels or rollers 16. Arriving at the point of operation, the frames 1 and 13 are brought to occupy a position on opposite sides of the stump and the stirrup 36 a position immediately above the stump. The coupling-bar 18 is then disconnected from the beam and the frame 13 lowered to rest squarely upon the surface of the ground, the wheels 16 being removed to permit the frame 13 to lie flat. The beam 19 is then free to rock upon the fulcrum-point 14. The chain 36', connected to the stirrup 36, is next passed around the stump and securely tied thereto, after which the draft-animals are connected to the free end of the hoisting rope or cable and driven forward to raise the front end of the beam, whereby an upward pull is exerted to extract the stump. The beam is then lowered and the parts again connected up in the manner shown in Fig. 1 to transport the device for further operation.

Draft clevises or connections 37 are provided at the sides of the frame 13 to enable draft-animals to be connected thereto to move said frame and rear end of the frame laterally when occasion requires after the device has been adjusted to pull the stump.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim, and desire to secure by Letters Patent, is—

1. In a stump-puller, the combination of a front frame, a rear frame having a fulcrum-point, wheels for supporting the rear portion of the rear frame, a lever detachably connected to the front and rear frames and adapted to rock upon the fulcrum-point of the latter frame, means for connecting the lever to a stump to be extracted, and means for connecting the forward end of the rear frame to said lever to support said forward end of the rear frame in elevated position.

2. In a stump-puller, the combination of a front supporting-frame, a rear supporting-frame having a fulcrum-point and a pin projecting therefrom, wheels for supporting the rear end of the rear frame, a lever detachably connected at its forward end to the front frame and provided at its rear end with a socket engaging the pin on the rear frame, said lever adapted to rock upon said fulcrum-point of the rear frame, a coupling-bar upon the rear frame, and means for connecting said coupling-bar to the lever to support the front portion of the rear frame in elevated position.

In testimony whereof I have hereunto set my hand in presence of two subscribing witnesses.

PETER HUDSON.

Witnesses:
J. P. HAUGHTON,
FRED. HIGGINS.